March 9, 1965  R. ALTSON  3,172,710

CAGE FOR ANTIFRICTION BEARINGS

Filed Feb. 13, 1962

*INVENTOR.*
RALPH ALTSON
BY *Edward H. Goodrich*

HIS ATTORNEY

United States Patent Office 3,172,710
Patented Mar. 9, 1965

3,172,710
CAGE FOR ANTIFRICTION BEARINGS
Ralph Altson, New York, N.Y., assignor to General Motors Corporation, Detroit, Mich., a corporation of Delaware
Filed Feb. 13, 1962, Ser. No. 172,909
4 Claims. (Cl. 308—217)

This invention relates to a cage for spacing the rolling elements in an antifriction bearing and particularly to an improved molded cage.

Rolling element bearings as roller and ball bearings usually are provided with a rotatable annular cage which circumferentially spaces the rolling elements from each other to provide uniform movement of these rolling elements and quiet operation of the bearing. These cages commonly comprise complicated and expensive metal assemblies having circumferentially spaced rolling element guiding pockets. The friction of the rolling elements against the side walls of the cage pockets and the rubbing action of such cages against one of the bearing race rings, even in the presence of bearing lubricant, often causes objectionable wear and detrimental heating within the bearing which results in shortened bearing life.

It is, therefore, an object of this invention to provide an improved cage for rolling elements and which is made of simple inexpensive molded parts that may be quickly and easily assembled.

It is further object to provide an improved cage for rolling elements and which after assembly holds the rolling elements in unit-handling relation with the cage.

It is a further object of this invention to provide an improved rolling element cage of interchanegable molded parts which may be easily and permanently secured together by a heat setting operation.

To these ends and also to improve generally upon devices of this character, the invention consists in the various matters hereinafter described and claimed. In its broader aspects, the invention is not necessarily limited to the specific structure selected for illustrative purposes in the accompanying drawings wherein FIGURE 1 is a fragmentary end view showing an assembled cage with several rolling elements in position.

Figure 1:
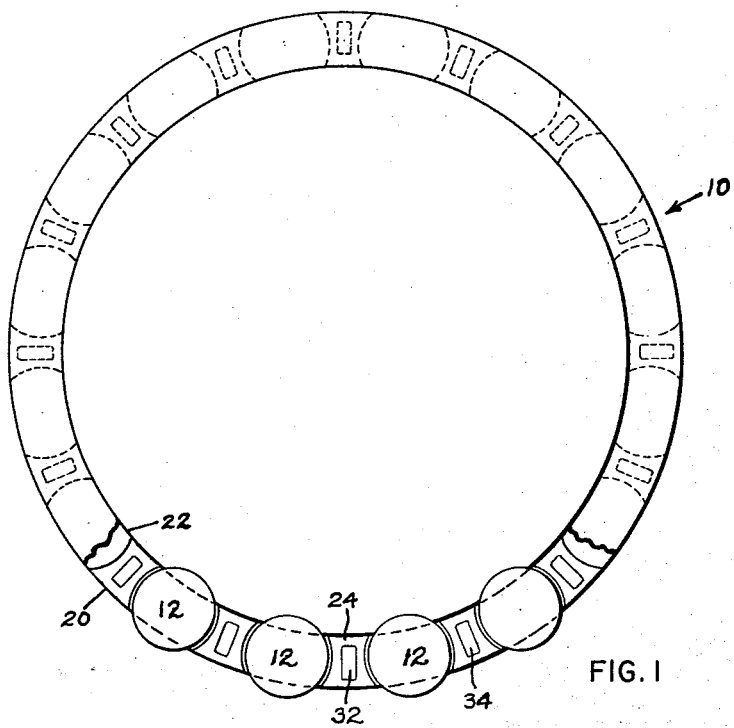

Referring to the drawings, my invention comprises a two-part annular cage 10 for circumferentially spacing and guiding rolling elements as rollers 12 in rolling engagement with inner and outer race rings of a roller bearing. These inner and outer race rings are not illustrated since they may be of conventional construction. Since the two parts of this cage are of identical construction and interchangeable, it will suffice to describe only one of these parts in detail. These two cage parts comprise molded annular interfitting members 14 and 16. The annular cage member 14 has an end ring 17 provided with a flat end face 18 radially extending between a cylindrical outer periphery 20 and a cylindrical inner periphery 22. A series of circumferentially spaced cross bars 24 and 26 of uniform cross section laterally extend axially outwardly in alternating relation from the inner side of the end ring. As illustrated, the top and bottom faces of these cross bars are preferably transversely curved in co-extensive relation with the outer and inner peripheral surfaces 20 and 22 of the end ring. Each of the cross bars 24 which lies in uniformly spaced relation between a pair of adjacent cross bars 26 extends the major portion of the distance across the cage between the end rings and exceeds the length of the shorter intermediate cross bar 26.

The outer ends of each of the cross bars 24 terminate in flat end faces 28 located in a common radial plane. Similarly, the outer ends of the shorter cross bars 26 terminate in flat ends 30 lying in a common radial plane intermediate the length of the cross bars 24. Each cross bar 24 has an axially outwardly projecting stud portion 32 herein illustrated as generally rectangular in cross section and having parallel side faces. It will be appreciated that the cross sectional shape of the studs 32 may be cylindrical or of other suitable shape if desired. An aperture 34 of corresponding cross sectional dimension to that of the stud portions 32 extends longitudinally through each cross bar 26 and through the end ring. The length of the studs 32 appreciably exceeds the length of the longitudinal apertures 34 in which these studs are matingly received.

With this arrangement, the duplicate cage members 14 and 16 may be interfitted with the studs received in and extending through the apertures 34 and with the corresponding end faces 28 and 30 in abutting engagement, thus providing a series of uniformly spaced cage pockets 36 which loosely retain the rollers 12 therein. The combined lengths of the cross bars 24 and 26 with the flat end faces 28 and 30 in abutting relation provides a transverse pocket length wherein the rollers are axially positioned with their flat end faces in closely adjacent relation to inner flat cage faces 40 at the ends of each pocket on each of the rings 14 and 16 between adjacent cross bars. The side faces of the cross bars 24 are preferably transversely curved at 42 in closely conforming relation to the curvature of the rollers 12 to loosely receive and retain each roller 12 in a pocket in unit-handling relation with the assembled cage.

Figure 2:
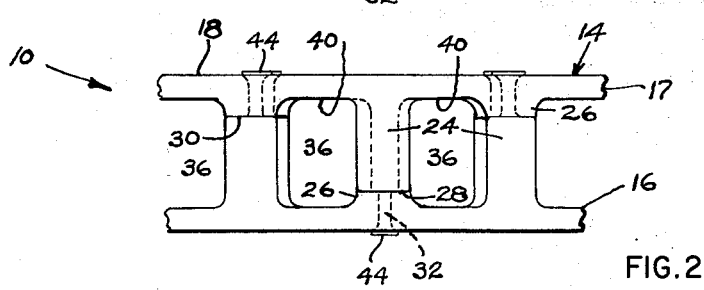
FIGURE 2 is a fragmentary plan view of my cage.
Figure 3:
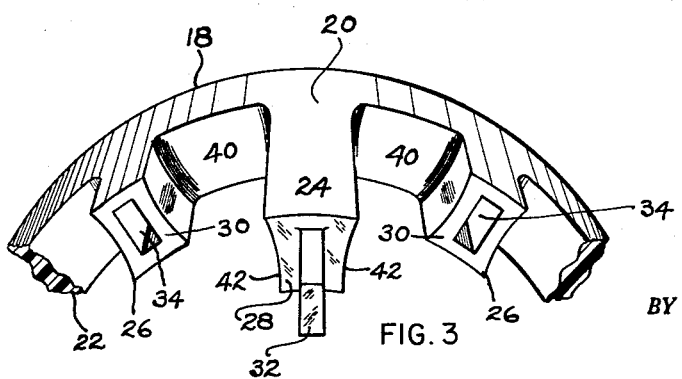
FIGURE 3 is a fragmentary perspective view of one of the interchangeable cage members.

The two interchangeable annular cage members 14 and 16 are preferably composed of a material which may be formed in a simple molding operation under the influence of heat and pressure. Such a material may comprise various plastics which will not be detrimentally affected by heat, light, or bearing lubricants and particularly materials which have a low coefficient of friction when guiding a rotating metal member as a roller 12 in the presence of normal bearing lubricants. A synthetic polymeric amide, commonly known under the trade name of "Nylon" and a polymeric tetrafluoroethylene, commonly known under the trade name of "Teflon," are examples of some of the materials which have been found to be satisfactory for my two interfitting cage parts. In assembly, the rollers are located in the pocket portions of one of the annular members 14 or 16 and the other annular member is interfitted with its stud portions 32 matingly received in the apertures 34. With the cage thus assembled, and with the end cross bar faces 28 and 30 in tight abutting relation, the projecting ends of the stud portions 32 are headed over at 44 by a heat setting operation under pressure to the form illustrated in FIGURE 2. If desired, the open ends of the apertures 34 at the end rings may be slightly bevelled to aid the securing relationship of the headed-over ends of the studs 32. With this arrangement, there is provided an easily constructed molded cage of simple two-part construction wherein the assembled cage and rollers form a unit-handling assembly which is easily installed in or removed from a bearing.

I claim:

1. A cage comprising a pair of duplicate molded annular plastic members for guiding rolling elements in an antifriction bearing, an end ring portion on each of said members, circumferentially spaced cross bars of uniform cross section extending laterally from each ring towards the other ring and cooperatively forming circumferentially spaced roller-receiving pockets, the alternating cross bars on one of said annular members being of different lengths than the intervening cross bars and having rectangular openings longitudinally extending therethrough and extending through the end ring portion of said annular member, rectangular plastic studs integral with and longitudinally projecting from the alternating cross bars on said other member and longitudinally extending respectively through said rectangular openings in fitting relation therein, and the outer ends of the studs being deformed to provide heads clamped against the end ring of said other annular member.

2. A cage comprising a pair of duplicate molded annular plastic members for guiding the rollers in an antifriction bearing, an end ring on each annular member, each end ring terminating in a flat end face extending through the radial width of said ring, correspondingly circumferentially spaced cross bars laterally extending from each end ring towards the other ring and cooperatively providing roller-receiving pockets, the alternating cross bars of each annular member being of the same length, the cross bars of each member intermediate said alternating bars being of the same length and less than that of said alternating bars, the cross bars of one of said members being in end-abutting relation with the cross bars of said other member, stud portions integral with and extending from the outer ends of alternating cross bars of each annular member and matingly received through openings extending through cross bars and the ring portion of the other annular member and heads on the stud ends engaging the outer flat end face of one of the end rings to secure said members together as a unit-handling assembly.

3. A cage comprising a pair of duplicate molded annular coaxial plastic members for guiding rollers in an antifriction bearing, an end ring on each annular member, corresponding circumferentially spaced cross bars laterally projecting from the inner face of each end ring towards the other ring and cooperatively providing roller retaining pockets, the alternating cross bars of each annular member terminating in a plane perpendicular to the common axis of the end rings, the cross bars of each member between said alternating cross bars being of a shorter length than that of said alternating bars and terminating in a common plane, the longer cross bars of one member matingly seating against shorter cross bars of the other member, molded stud portions integral with and respectively projecting endwise from the ends of the longer cross bars, each of the shorter cross bars having a longitudinally extending opening extending therethrough and through an end ring, each opening having a bevelled portion at the outer face of said end ring, said stud portions respectively extending through said opening and the outer end of each stud being deformed into a head which is expanded within one of said bevelled portions thus permanently securing the annular members together as an assembled unit.

4. A cage comprising a pair of duplicate molded coaxial annular plastic member for guiding rollers in an antifriction bearing, an end ring on each annular member, corresponding circumferentially spaced cross bars of uniform cross section laterally extending from each end ring towards the other ring and cooperatively providing roller retaining pockets, the alternating cross bars of each annular member extending through the major portion of the length of each pocket and terminating in a plane perpendicular to the common axis of the end rings, the cross bars of each member intermediate of said alternating cross bars being of a shorter length than that of said alternating bars and having flat ends in respectively abutting relation with said alternating cross bars on the other annular member, molded stud portions of substantially rectangular cross section and integral with and respectively extending endwise from the ends of said longer alternating cross bars, each of said shorter cross bars having a longitudinally extending opening matingly receiving a stud portion therethrough and terminating in a bevelled open end at the outer face of one of said rings, said stud portions being respectively deformed under pressure into flattened heads which are expanded into wedged relation within said bevelled open ends to secure the annular members together as a unit handling assembly.

References Cited in the file of this patent

UNITED STATES PATENTS

| | | |
|---|---|---|
| 2,017,772 | Schildgen | Oct. 15, 1935 |
| 2,861,849 | Case | Nov. 25, 1958 |
| 2,923,582 | Dunn | Feb. 2, 1960 |
| 2,977,164 | Witte | Mar. 28, 1961 |

FOREIGN PATENTS

| | | |
|---|---|---|
| 149,270 | Great Britain | Mar. 31, 1921 |
| 871,706 | Great Britain | June 28, 1961 |